Patented Sept. 7, 1943

2,328,903

UNITED STATES PATENT OFFICE 2,328,903

DYEING VINYL POLYMERS

Karl Heymann, Meadville, Pa., assignor to American Viscose Corporation, Wilmington, Del., a corporation of Delaware No Drawing. Application December 27, 1939, Serial No. 311,109

10 Claims. (Cl. 8—55)

This invention relates to improvements in methods of dyeing yarns and other shapes comprising materials that are not readily permeable to water. More particularly, the invention relates to improvements in methods of dyeing yarns and other shapes comprising vinyl polymers, such as polymers of vinyl chloride and copolymers of vinyl acetate and vinyl chloride.

Materials that are not readily permeable to water can not be satisfactorily dyed by the ordinary dyeing procedure used in dyeing cotton, wool, natural silk and regenerated cellulose. When ordinary methods of dyeing are attempted the dye either does not penetrate the material and no dyeing is effected or when dyeing is effected the color is not fast and leaches out.

Yarns and other shapes of cellulose acetate which are not readily permeable to water have been dyed when treated with a liquid swelling agent, such as alcohol, acetone or acetic acid. The swelling agent forms or opens pores in the material into which the dye penetrates. There are certain objections to the use of liquid swelling agents. Generally a large amount of swelling agent is required. Also the swelling agent has a tendency to weaken the yarn or shape.

I have discovered that yarns and other shapes comprising vinyl polymers, such as polymers of vinyl chloride and copolymers of vinyl acetate and vinyl chloride can be successfully dyed with suspension dyestuffs when the dyeing operation is carried out in the presence of suspensions of certain normally solid organic compounds which have a solubility in polymers of vinyl chloride and copolymers of vinyl acetate and vinyl chloride of 2% or greater under the conditions at which the dyeing is carried out. By the term suspension dyestuffs is meant dyestuffs of the type applicable to cellulose acetate from a dispersion (insoluble anthraquinone and azo dyes) sometimes referred to as dispersol dyes, and the dyestuffs referred to hereinafter in the examples by their trade names, are of this type. The compounds which are referred to as assistants include:

Diphenyl
Naphthalene
Phenanthrene
a-Naphthol
b-Naphthol
Thio-b-naphthol
2.4-dichloro-a-naphthol
2.4-dibromo-a-naphthol
o-Hydroxydiphenyl
2-chloro-o-phenylphenol
4-chloro-o-phenylphenol
o-Cyclohexylphenol
2.4-dichloroaniline
2.5-dichloroaniline
a-Naphthylamine
b-Naphthylamine
Phenyl-a-naphthylamine
Phenyl-b-naphthylamine
o-Aminodiphenyl
p-Aminodiphenyl
p-Dimethylamino-benzaldehyde
o-Hydroxyacetophenone
Benzophenone
p-Hydroxybenzophenone
Methyl-b-naphthylketone
Camphor
8-hydroxyquinoline
b-Naphthylacetate In carrying out my improved method of dyeing a suspension of a single assistant or several assistants together may be used. The assistant is, for example, dissolved in a suitable solvent, such as alcohol, and the assistant in solution and a suitable dispersing agent, such as that known in the trade as Igepon T, are added to the dye bath. The dye bath contains a suspension dyestuff. The assistant is precipitated in the dye bath in colloidal or very finely divided form. When amino compounds are used as assistants they may be dissolved in an acid solution and precipitated and dispersed in an alkaline dye bath. Phenols may be dissolved in an alkaline solution and precipitated and dispersed in an acid dye bath. Satisfactory results are also obtained under certain conditions when the phenol solution is added to the dye bath and is not dispersed. The yarn or shape to be dyed is treated with the dye bath containing the assistant in the ordinary manner. This procedure may be followed using various quantities of dyestuff and assistants with different dye bath ratios and temperatures of the dye baths depending upon the character of the material being dyed and the type of dyeing that is being carried out. A satisfactory procedure is one in which the dye bath ratio is 1:30 and contains 1.5% suspension dyestuff with 5% or less of assistant based on the weight of the yarn or shape to be dyed. A suitable dye bath temperature is about 50° C. and the duration of the dyeing operation one hour. Other temperatures may also be used.

My invention may also be carried out by applying the assistant from suspension directly to the yarn or shape. When the yarn or shape is thereafter immersed in the dye bath the assistant aids the action of the dye bath on the yarn or shape in the same manner as when it has been added to the dye bath.

Instead of using either of the above methods, I may add the assistant directly to the vinyl polymers before the yarn or shape is formed. The yarn or shape containing the assistant is treated with the dye bath in the ordinary manner.

The following examples are illustrative of the invention:

*Example 1.*—Yarns comprising copolymers of vinyl acetate and vinyl chloride were dyed in dye baths having a dye bath ratio of 1:30 and containing 1.5% suspension dyestuff and 5% b-Naphthol based on the weight of the yarn. The temperatures of the dye baths were 60° C. and the duration of the dyeing operation one hour. The dyestuffs that were used were Cibacete Orange 2R
    Cibacete Scarlet G
    Acele Violet B
    Acele Yellow 3G A dye bath was also used with Cibacete Scarlet G 1% and Acele Violet B 1% as the dyestuff.

*Example 2.*—Yarns comprising copolymers of vinyl acetate and vinyl chloride were dyed in dye baths having a dye bath ration of 1:30 and containing 1.5% suspension dyestuff and 5% p-Dimethylamino-benzaldehyde based on the weight of the yarn. The temperatures of the dye baths were 60° C. and the duration of the dyeing operation one hour. The dyestuffs that were used were Celliton Red Violet RR
    Celliton Navy Blue PV
    Celliton Red R
    Celliton Brill. Blue B
    Celliton Rubine BS
    Celliton Direct Yellow 3GP ex. conc.

*Example 3.*—Yarns comprising copolymers of vinyl acetate and vinyl chloride were dyed in dye baths having a dye bath ratio of 1:30 and containing 1.5% suspension dyestuff and 1.5% benzophenone based on the weight of the yarn. The temperatures of the dye baths were 60° C. and the duration of the dyeing operation one hour. The dyestuffs that were used were Celliton Fast Pink BA
    Acele Scarlet G
    Calconese Orange 3RC
    Cibacete Violet B
    Celutate Fast Blue GL
    Artisil Direct Yellow 3G ex.
    Phenacyl Red R

*Example 4.*—Yarns comprising copolymers of vinyl acetate and vinyl chloride were dyed in dye baths having a dye bath ratio of 1:30 and containing 1.5% suspension dyestuff and 5% o-hydroxydiphenyl based on the weight of the yarn. The temperatures of the dye baths were 60° C. and the duration of the dyeing operation one hour. The dyestuffs that were used were Celliton Pink RF
    Celliton Red BP
    Celliton Orange 3RN
    Cibacete Yellow 2RN
    Celliton Fast Yellow GRA
    Cibacete Yellow 5G
    Cibacete Brill. Blue BGG
    Celliton Fast Blue FFRS
    Celliton Discharge Violet B
    Cibacete Discharge Violet 5R
    Camacyl Brill. Green B
    Phenacyl Red R
    Cibacete Violet B
    Artisil Direct Yellow 3GP ex. conc.
    Celliton Fast Brown 5RA

*Example 5.*—Yarns comprising copolymers of vinyl acetate and vinyl chloride were treated with a bath in a ratio of 1:30 containing 5% o-hydroxydiphenyl based on the weight of the yarn at a temperature of 60° C. and for a period of one-half hour. The yarns so treated were then dyed by immersing in dye baths having a dye bath ratio of 1:30 and containing 1.5% suspension dyestuff based on the weight of the yarn. The temperatures of the dye baths were 60° C. and the duration of the dyeing operation one hour. The dyestuffs that were used were Camacyl Brill. Green B
    Phenacyl Red R
    Cibacete Violet B
    Artisil Direct Yellow 3GP ex. conc.
    Celliton Fast Brown 5RA While preferred assistants and procedures have been shown it is to be understood that changes and variations may be made without departing from the spirit and scope of the invention as defined in the appended claims.

What I claim is:

1. A method of dyeing shapes comprising copolymers of vinyl acetate and vinyl chloride, comprising the step of treating the shape with a dye bath containing a suspension dyestuff in the presence of dispersed diphenyl.

2. A method of dyeing shapes comprising copolymers of vinyl acetate and vinyl chloride, comprising the step of treating the shape with a dye bath containing a suspension dyestuff and dispersed diphenyl.

3. A method of dyeing shapes comprising vinyl polymers comprising the step of treating the shape with a dye bath containing a suspension dyestuff in the presence of dispersed diphenyl.

4. A method of dyeing shapes comprising vinyl polymers comprising the step of treating the shape with a dye bath containing a suspension dyestuff and dispersed diphenyl.

5. The method of dyeing shapes comprising vinyl polymers comprising forming a solution of a normally solid aromatic hydrocarbon which has a solubility in the vinyl polymers of at least 2% under the conditions at which the dyeing is carried out, in a solvent, adding the solution and a dispersing agent to a dye bath containing a suspension dyestuff to precipitate and disperse said hydrocarbon in the dye bath and treating the shape therewith.

6. The method of dyeing shapes comprising copolymers of vinyl acetate and vinyl chloride comprising forming a solution of a normally solid aromatic hydrocarbon which has a solubility in the vinyl polymers of at least 2% under the conditions at which the dyeing is carried out, in a solvent, adding the solution and a dispersing agent to a dye bath containing a suspension dyestuff to precipitate and disperse said hydrocarbon in the dye bath and treating the shape therewith.

7. The method of dyeing shapes comprising vinyl polymers comprising forming a solution of naphthalene in a solvent, adding the solution and a dispersing agent to a dye bath containing a suspension dyestuff to precipitate and disperse said naphthalene in the dye bath and treating the shape therewith.

8. The method of dyeing shapes comprising copolymers of vinyl acetate and vinyl chloride comprising forming a solution of naphthalene in a solvent, adding the solution and a dispersing agent to a dye bath containing a suspension dyestuff to precipitate and disperse said naphthalene in the dye bath and treating the shape therewith.

9. The method of dyeing shapes comprising vinyl polymers comprising forming a solution of phenanthrene in a solvent, adding the solution and a dispersing agent to a dye bath containing a suspension dyestuff to precipitate and disperse said phenanthrene in the dye bath and treating the shape therewith.

10. The method of dyeing shapes comprising copolymers of vinyl acetate and vinyl chloride comprising forming a solution of phenanthrene in a solvent, adding the solution and a dispersing agent to a dye bath containing a suspension dyestuff to precipitate and disperse said phenanthrene in the dye bath and treating the shape therewith.

KARL HEYMANN.